Figure 5:
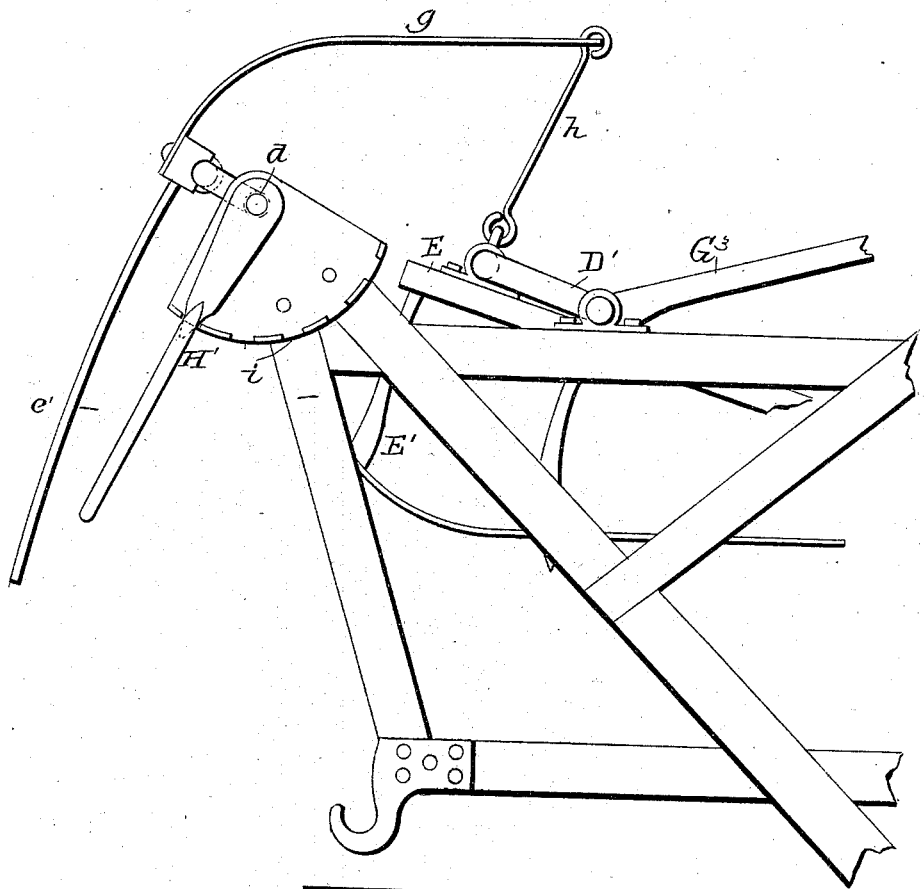

(No Model.) 3 Sheets—Sheet 1.
J. E. SPONSELLER.
BAND CUTTER AND FEEDER.
No. 552,591. Patented Jan. 7, 1896.
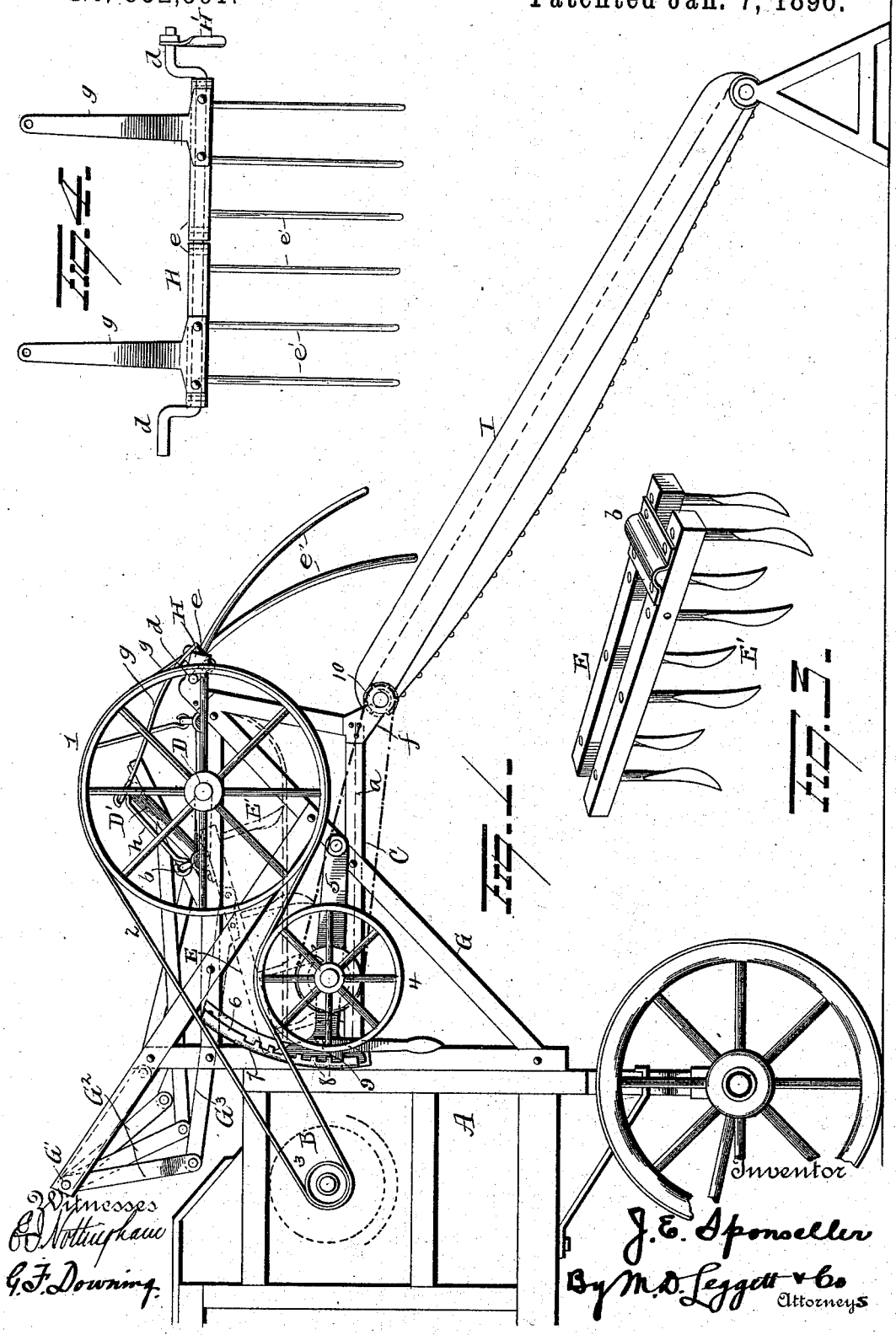
Witnesses
O. J. Nottingham
G. F. Downing
Inventor
J. E. Sponseller
By M. D. Leggett & Co.
Attorneys

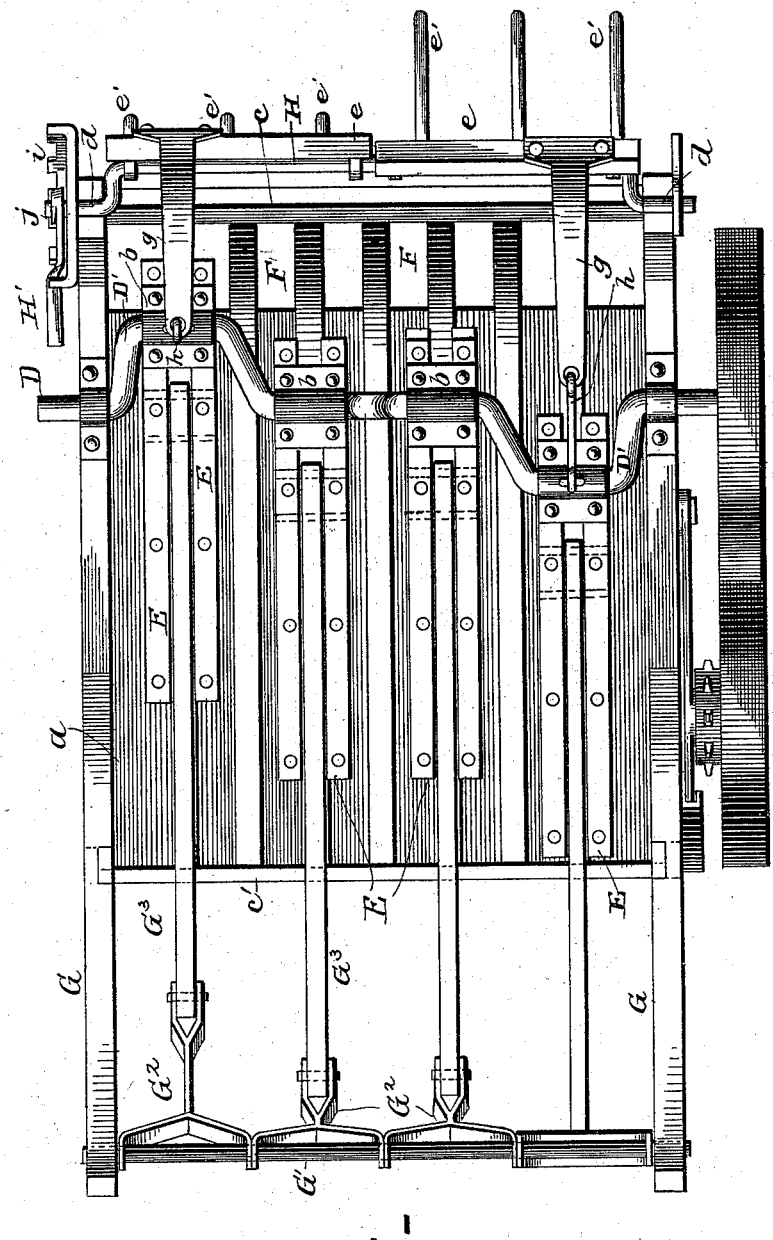

(No Model.)

J. E. SPONSELLER.
BAND CUTTER AND FEEDER.

No. 552,591.

3 Sheets—Sheet 3.

Patented Jan. 7, 1896.

Witnesses
E. D. Nottingham
G. F. Downing

Inventor
J. E. Sponseller
By M. D. Leggett & Co
Attorneys

UNITED STATES PATENT OFFICE.

JOHN E. SPONSELLER, OF HOISINGTON, KANSAS.

BAND-CUTTER AND FEEDER.

SPECIFICATION forming part of Letters Patent No. 552,591, dated January 7, 1896.

Application filed May 18, 1895. Serial No. 549,803. (No model.)

*To all whom it may concern:*

Be it known that I, JOHN E. SPONSELLER, of Hoisington, in the county of Barton and State of Kansas, have invented certain new and useful Improvements in Band-Cutters and Feeders for Thrashing-Machines; and I do hereby declare the following to be a full, clear, and exact description of the invention, such as will enable others skilled in the art to which it appertains to make and use the same.

My invention relates to an improvement in band-cutters and feeders for thrashing-machines, the object of the invention being to produce simple and efficient means whereby to cut the bands on bundles of grain and effectually and automatically feed the grain to the thrashing-cylinder in proper quantities.

A further object is to provide feeding-fingers for causing the grain to be moved forward from an inclined conveyer and to provide means for adjusting said fingers whereby to cause them to feed the grain more or less rapidly or to compensate for the difference in size of the bundles of grain.

A further object is to produce simple and efficient means for regulating and controlling the operation of the apparatus.

A further object is to produce a band-cutter and feeder which shall be simple in construction, accurate and automatic in operation, and effectual in all respects in the performance of its functions.

With these objects in view the invention consists in certain novel features of construction and combinations and arrangements of parts, as hereinafter set forth and pointed out in the claims.

In the accompanying drawings, Figure 1 is a side elevation illustrating my improvements. Fig. 2 is a plan view. Figs. 3 and 4 are detail views, and Fig. 5 is a view in side elevation of the opposite side from that shown in Fig. 1.

A represents a portion of the framework of a thrashing-machine, and B the thrashing-cylinder. To the forward end of the thrashing-machine a frame C is secured and provided with a platform or grain-floor $a$. A shaft D is mounted on the frame C, and made with a series of crank-arms D' disposed at various angles, and to each crank-arm two bars E are loosely connected at their rear ends by means of journal-boxes or brackets $b$. To each bar E a series of depending fingers or knives E' are secured and adapted to operate between a series of slats F, the latter being secured at their forward ends to a cross-bar $c$ of the frame C, and at their rear ends are curved upwardly and secured to a cross-bar $c'$ at the rear end of said frame C. The slats F are preferably made of spring metal, so that they will yield should an excessive amount of grain accumulate between them and the platform or floor $a$. Inclined timbers G are secured to the sides of the frame C and project rearwardly and upwardly beyond the same, the free ends of said timbers being connected by a cross-bar G', to which latter a series of depending arms $G^2$ are pivotally connected. To the lower end of each arm $G^2$ the rear end of a rod or pitman $G^3$ is pivotally connected, and the forward ends of said rods or pitmen are secured between the respective pairs of bars E at points in proximity to the forward ends of the latter and in rear of the crank-arms of the shaft D.

At the forward end of the frame C crank-arms $d$ at the respective ends of a rock-shaft H are mounted, and to said rock-shaft two (more or less) heads $e$ are loosely connected. A series of fingers $e'$ are secured to each head $e$ and depend therefrom, their lower ends terminating over the upper portion of an inclined conveyer I, the upper roller of which is mounted in suitable brackets $f$ secured to the frame C. To each head $e$ rearwardly-projecting spring-arms $g$ are secured, the free ends of said spring-arms being connected with cranks of the shaft D or with the journal-boxes thereon by means of pivoted rods or links $h$.

From the construction and arrangement of parts above described it will be seen that when the crank-shaft D is rotated the finger or knife bars E will be oscillated and caused to mark a nearly oval path and that a vibratory motion will be simultaneously imparted to the fingers $e'$. The fingers $e'$ thus serve to feed the grain forward from the inclined conveyer to the platform $a$, where it will be met by the fingers or knives E', which will cut the bands on the bundles of grain and feed the latter forward to the thrashing-cylinder.

It often becomes desirable to adjust the fingers e' relatively to the conveyer or the amount of grain passing over the same or the size of the bundles of grain. To accomplish this adjustment of the fingers they are connected with the rock-shaft H in the manner above explained, and said rock-shaft is provided with an operating-lever H' by means of which to move it, said operating-lever having a dog j to engage the teeth of a toothed segment i secured to the frame C, whereby to lock the rock-shaft at any desired adjustment. In this manner the ends of the fingers can be made to approach more or less the conveyer. A band-wheel 1 is secured to the end of the crank-shaft D and receives motion, by means of a belt 2, from a pulley 3 on the shaft of the thrashing-cylinder, said belt also passing over a pulley 4 mounted on a pivoted arm 5. The free end of the arm 5 is guided by means of a flange 6 on a segment 7 secured to the frame C, and said flange is provided with teeth 8 to be engaged by a dog 9 pivoted to the arm 5. By moving the arm 5 so that the pulley 4 will bear with more or less pressure against the belt 2 the speed of the band-cutter and feeder can be regulated, and by moving the arm 5 so that the belt will become loose no motion will be imparted to said mechanism. When the belt is tight, motion will be imparted to the pulley 4 and to a pulley 10 carried thereby and motion is imparted from the latter to the conveyer I by means of a strap or belt 11. Thus it will be seen that by moving the arm 5 the operation of the entire feeding mechanism can be controlled.

My improvements are simple in construction, comparatively cheap to manufacture and are effectual, in all respects, in the performance of their functions.

Having fully described my invention, what I claim as new, and desire to secure by Letters Patent, is—

1. In a band cutter and feeder, the combination with a crank shaft, knife bars connected therewith and knives or fingers secured to said bars and depending therefrom, of oscillatory heads, fingers projecting from said heads and adapted to feed the grain under the knife bars, spring arms projecting from said heads and connections between said spring arms and the crank shaft, substantially as set forth.

2. In a band cutter and feeder, the combination with a suitable feeding conveyer, of a rock shaft having cranks thereon upon which it is supported, fingers connected with this shaft, means for rocking these fingers thereon, and an adjustment for turning the rock shaft on its bearings and setting it in different positions relative to its bearings, substantially as set forth.

3. In a band cutter and feeder, the combination with a main rotary crank shaft, and a rock shaft having cranks thereon by which it is supported on the body of the machine, of fingers mounted loosely on the rock shaft, means extending from these fingers to the cranks of the main crank shaft for rocking these fingers and an adjustment for turning the rock shaft in its bearings and setting it in different positions relative to its bearings, substantially as set forth.

4. In a band cutter and feeder, the combination with a crank shaft, bars connected therewith, and fingers or knives depending from said bars, of vibratory fingers adapted to feed the grain under said first-mentioned fingers, connections between said vibratory fingers and the crank shaft, and means for adjusting said vibratory fingers whereby to cause them to operate in a higher or lower plane, substantially as set forth.

5. In a band cutter and feeder, the combination with means for cutting the bands on the bundles of grain, of a crank shaft, heads mounted on said crank shaft, fingers projecting from said heads and adapted to be vibrated whereby to feed grain to the band cutters, a lever secured to the crank shaft whereby to turn it and adjust the fingers to cause them to operate in a higher or lower plane, and means for locking said lever, substantially as set forth.

6. In a band cutter and feeder, the combination with a frame, a platform and a crank shaft mounted on the frame, of a series of bars pivotally connected at their forward ends to said crank shaft, fingers or knives secured to said bars, timbers projecting from the frame, a shaft at the free ends of said timbers, arms pivotally connected to said shaft, and rods pivotally connected at one end to said arms and at their other ends secured to the finger or knife bars at points in proximity to the forward ends of the latter, substantially as set forth.

7. In a band cutter and feeder, the combination with a frame, of a crank shaft mounted therein, finger bars connected with the crank shaft, fingers secured to said bars, a pulley secured to the crank shaft, a belt passing over said pulley, means for transmitting motion to said belt, a pivoted arm, a pulley carried by said pivoted arm and adapted to bear against the belt, means for locking said pivoted arm at any desired adjustment, a conveyer, a pulley carried thereby, a small pulley adapted to rotate with the pulley on the pivoted arm and a strap connecting said small pulley and the pulley on the conveyer, whereby to transmit motion to the latter, when in its normal adjustment and stop it when the belt which the pulley tightens is loosened, substantially as set forth.

8. The combination with two shafts, pulleys thereon, a belt passing around said pulleys, a conveyer shaft, and a pulley thereon, of a pivoted arm carrying a pulley for tightening the belt and also one over which a strap from the conveyer shaft pulley passes said arm adapted to be swung to simultaneously tighten or loosen both the belt and strap, substantially as set forth.

In testimony whereof I have signed this specification in the presence of two subscribing witnesses.

JOHN E. SPONSELLER.

Witnesses:
J. W. SODERSTROM,
G. F. CRAGIN.